United States Patent [19]

Castro

[11] Patent Number: 5,359,642
[45] Date of Patent: Oct. 25, 1994

[54] METHOD AND APPARATUS FOR PREPAYMENT OF TELECOMMUNICATION CONNECTIONS BY REGISTERED GROUPS OF SUBSCRIBERS IN A TELECOMMUNICATION SWITCHING NETWORK

[75] Inventor: Peter D. Castro, New York, N.Y.

[73] Assignee: International Integrated Communications, Inc., Freeport, N.Y.

[21] Appl. No.: 23,335

[22] Filed: Feb. 26, 1993

Related U.S. Application Data

[63] Continuation of Ser. No. 785,272, Oct. 30, 1991, abandoned.

[51] Int. Cl.$^5$ .................................... H04M 15/00
[52] U.S. Cl. .................................. 379/121; 379/124; 379/126; 379/127
[58] Field of Search .............. 379/94, 112, 114, 115, 379/121, 124, 125, 126, 127, 144, 145

[56] References Cited

U.S. PATENT DOCUMENTS

| | | |
|---|---|---|
| Re. 32,263 | 3/1985 | Kaminsky . |
| 3,769,463 | 10/1973 | Graham et al. . |
| 4,404,433 | 4/1981 | Wheeler et al. . |
| 4,518,824 | 5/1985 | Mondardini ..................... 379/144 |
| 4,525,601 | 6/1985 | Barnich et al. . |
| 4,585,904 | 4/1986 | Mincone et al. . |
| 4,706,275 | 11/1987 | Kamil ............................. 379/144 |
| 4,717,815 | 1/1988 | Tomer . |
| 4,860,346 | 8/1989 | Mellon . |
| 4,866,761 | 9/1989 | Kakizaki . |
| 4,879,744 | 11/1989 | Tasaki et al. . |
| 4,897,870 | 1/1990 | Golden ........................... 379/144 |
| 4,975,942 | 12/1990 | Zebryk . |
| 5,003,585 | 5/1991 | Richer ............................ 379/144 |
| 5,086,891 | 11/1991 | Marshall ...................... 379/144 X |

OTHER PUBLICATIONS

"Digital Transmission Building Blocks," by Steweart D. Personick, published by IEEE, cover page, pp. 1, 27–36, Jan. 1980.

Primary Examiner—Stephen Chin
Assistant Examiner—Paul Loomis
Attorney, Agent, or Firm—Hopgood, Calimafde Kalil & Judlowe

[57] ABSTRACT

The present invention provides a method and apparatus for prepayment of telecommunication connections between first and second telecommunication devices operably associable with the telecommunication lines of a telecommunication switching network. In general, the method involves storing monetary value data representative of a prepaid e.g. deposited in a centralized storage device, amount of monetary value available for payment of telecommunication connections in the telecommunication switching network. At the initiation of the first telecommunication device, a telecommunication connection is established between the first and second telecommunication devices so that a telecommunication process can be conducted therebetween. The telecommunication connection between the first and second telecommunication devices is terminated in response to termination of the telecommunication process. The time duration of the telecommunication connection is measured. The cost of the telecommunication connection is computed using the measured time duration and applicable prepaid rate data. The stored monetary value data is processed to indicate a decrement in the available prepaid monetary value, which decrement is essentially equal to the computed cost of the telecommunication connection. Telecommunication cost computing apparatus are provided for carrying out the method of the present invention using various telecommunication devices including privately sponsored prepay-type and cellular phones. Advantageously, the present invention allows groups of registered subscribers to prepay a bulk amount of monetary funds for telecommunication connections initiated by the members of the registered group, and thereby acquire preferred calling rates.

5 Claims, 3 Drawing Sheets

METHOD AND APPARATUS FOR PREPAYMENT OF TELECOMMUNICATION CONNECTIONS BY REGISTERED GROUPS OF SUBSCRIBERS IN A TELECOMMUNICATION SWITCHING NETWORK

This application is a continuation of U.S. patent application Ser. No. 07/785,272, filed Oct. 30, 1991, now abandoned.

BACKGROUND OF THE INVENTION

1. Field of the Invention

The present invention generally relates to methods and apparatus for prepayment of telecommunication connections in a telecommunication switching network, and more particularly to such methods and apparatus utilizing stored data representative of prepaid monetary value available for expenditure in the computed cost of such telecommunications connections.

2. Brief Description of the Prior Art

Prepayment of telephone calls is generally well known in the art. For example, a variety of prepayment telephone systems are disclosed in U.S. Pat. Nos. 4,706,275 to Kamil; 4,879,744 to Tasaki, et al.; and 4.975,942 to Zebryk.

U.S. Pat. No. 4,706,275 to Kamil discloses a telephone system which requires a special exchange for storing data representative of a prepurchased monetary value deposited to the credit of the calling party. This special exchange permits access to the central switching station by the calling party transmitting to the special exchange, a special code and the number of the called party. If the special code is valid and the initial prepayment amount is sufficient at the time of calling, then the calling party is connected to the called party. During the connection, the running cost of the call is monitored (i.e. computed). When either party hangs up, or the running cost of the call exceeds the current initial prepayment amount, whichever occurs first, the calling party is disconnected. Thereafter, the computed running cost of the call is deducted from the initial prepayment amount.

U.S. Pat. No. 4,879,744 to Tasaki, et al. discloses a card-operated telephone system which is adapted for installation in a telecommunication switching network. The card-operated telephone includes a magnetic strip reader/writer which reads data from a magnetic telephone card and writes necessary data into the telephone card. This stored data represents the balance of a prepurchased monetary value, and card issue number. Each time the telephone card is used, billing information is computed at the central telephone office, transmitted to the telephone system and used to diminish the balance of the prepurchased monetary value by the computed cost of each call. Also, the first time the card is used, the telephone system records the dialed number of the telephone card and automatically dials the recorded number each time the card is subsequently used.

U.S. Pat. No. 4,975,942 to Zebryk discloses a credit/calling card pay telephone system. The system includes a local telephone unit having a telephone instrument and a self-contained database. The self-contained database is provided for checking the validity of an entered calling card or credit card number. Upon entering the number to be dialed and the calling or credit card number, and after its validity is checked in the database, this information is stored and the call is processed by outdialing on a standard subscriber telephone line. During the call, the line is monitored until terminated and the transaction record is stored in non-volatile memory. After a programmable number of calls, a period of time or combination thereof, the local unit automatically dials a local host computer with its own internal modem. Upon connection, the local telephone unit transmits its transaction records in batches to the host computer, which subsequently generates billing information with calculated charges.

While such prior art systems facilitate prepayment of phone calls, they nevertheless suffer from significant shortcomings and drawbacks.

In particular, prior art prepayment systems generally require an extensive infrastructure which is both expensive and difficult to implement in practice. Also, the cost of operating such prior art prepayment systems is generally high due to data communication required for call confirmation, charge computations, and billing procedures.

Thus, there is a great need in the art for a method and apparatus that permits prepayment of telecommunication connections without the shortcomings and drawbacks of the prior art.

Objects of the Present Invention

Accordingly, it is a primary object of the present invention to provide a method and apparatus for prepayment of telecommunication connections, wherein an amount of monetary value is prepaid, represented as data stored, for example, in a billing system, and is used to pay for the computed cost of telecommunication connections within a telecommunication switching network.

It is a further object of the present invention to provide a method and apparatus for prepayment of telecommunication connections, wherein an amount of monetary value is prepaid, represent in the form of monetary value data stored in a centralized storage device associated with a central switching system, and decremented during or after procurement of each telecommunication connection.

The present invention can be applied to 800 number calls, privately-sponsored prepay telephones and cellular telecommunications devices.

These and other objects of the present invention will become apparent hereinafter.

SUMMARY OF INVENTION

The present invention provides a method and apparatus for prepayment of telecommunication connections between at least first and second telecommunication devices, each operably associable with the telecommunication lines of a telecommunication switching network.

In general, the method involves storing in a centralized storage means, monetary value data representative of a prepaid (i.e. deposited) amount of monetary value available for payment of telecommunication connections within the switching network. At the initiation of the first telecommunication device, a telecommunication connection is established between the first and second telecommunication devices so that a telecommunication process can be conducted therebetween. The time duration of the telecommunication connection is measured. The telecommunication connection between the first and second telecommunication devices is terminated in response to termination of the telecommunication process. In response to the termination of the telecommunication connection, the measurement of the time duration of the telecommunication connection is ceased. The cost of the telecommunication connection is computed using applicable rate data and the measured time duration. The stored monetary value data is processed to indicate a decrement in available prepaid monetary value, which is essentially equal to the computed cost of the telecommunication connection.

Telecommunication-cost metering apparatus of the present invention may be embodied in an infinitely wide number of systems and/or devices while carrying out the general principles of the method hereof.

According to one aspect of the present invention, the telecommunication-cost metering apparatus is realized in the form of a central switching station and associated billing system, that permits prepayment of telecommunication connections using conventional telecommunication devices operably connected within the network. The associated billing system stores monetary value data representative of an amount of prepaid monetary value available to each prepaid subscriber line which is preregistered in a directory. When a telecommunication connection(s) is initiated within the network by a telecommunication device operably connectable to a prepaid subscriber line, transaction record data is produced for the telecommunication process conducted across the telecommunication connection(s). This transaction record data is subsequently utilized to compute the cost of the corresponding telecommunication connection, and the computed cost is then used to process the monetary data so as to reflect a decrement in the available prepaid monetary value.

As a result of the present invention, a number of significant advantages are provided. For example, any group of subscriber lines or assigned subscriber numbers can be registered with one or more associated billing systems so that each such subscriber line or number has access to a centralized prepaid monetary fund. Preferably, the central reserve of prepaid monetary value is available to each subscriber line or number registered as a member in a prepaid group.

For example, in a first embodiment, the centralized monetary fund is available to a party who is called by any number of non-subscribing parties, using for example, an "800" number. In this way, the sponsor of prepaid telecommunication lines (i.e. numbers) can prepay for incoming calls placed by non-subscribing parties over such lines, using the prepaid amount of monetary value available to the sponsor.

In a second embodiment, a centralized monetary fund is available to each privately-sponsored prepay telecommunication device registered as a member of a prepaid group.

In a third embodiment, a centralized monetary fund is available to each cellular telecommunication device registered as a member in a prepaid group.

As a result of the present invention, bulk amounts of monetary value prepaid to telecommunication carriers, will permit prepaid subscriber groups to use telecommunication lines and connections at fixed rates based on the bulk amount of monetary value prepurchased, resulting in substantial savings to consumers and benefit to telecommunications carriers alike. At the same time, telecommunication carriers can anticipate the future volume of telecommunications connections through the network based on prepaid deposits in monetary funds.

BRIEF DESCRIPTION OF THE DRAWINGS

For a further understanding of the objects of the present invention, the Detailed Description of the Illustrated Embodiments will be described in connection with the following drawings, in which.

DETAILED DESCRIPTION OF THE ILLUSTRATED EMBODIMENTS

Figure 1:
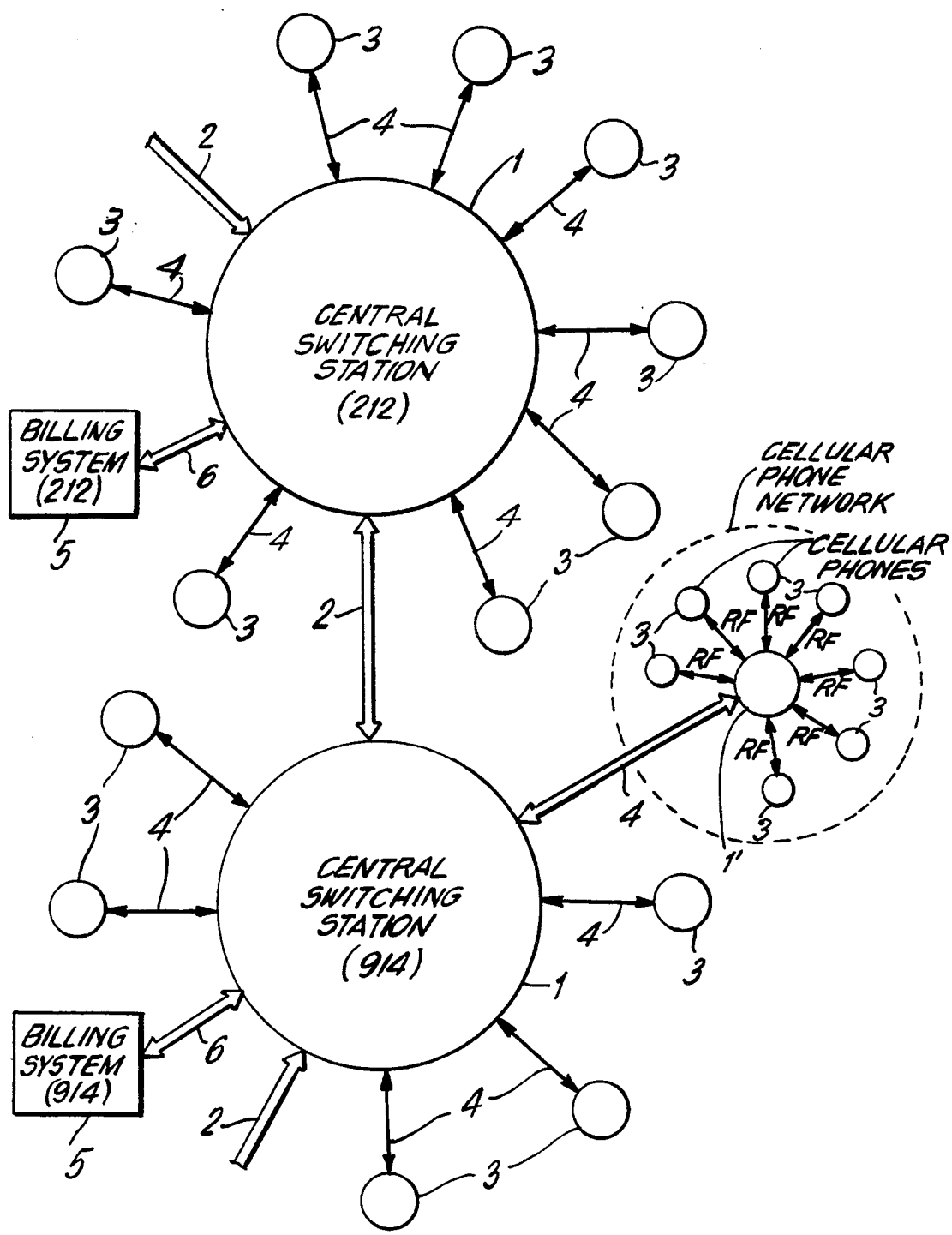
FIG. 1 is a schematic representation of a telecommunication switching network according to one aspect of the present invention, showing a plurality of central switching stations in communication with each other by way of trunk-line circuits, second billing systems according to the present invention in operable association with respective central switching stations, and a plurality of conventional telecommunication devices each connected to a central switching station by way of an assigned telecommunication line.

In FIG. 1, a portion of a public telecommunication switching network (PTSN) according to the present invention is schematically represented. For purposes of illustration and to avoid obfuscation of the present invention, only the central switching stations and exemplary billing systems for two area codes, i.e. 914 and 212, are shown. As illustrated, central switching station 1 for area code 914 is in communication with the central switching station for area code 212 by way of trunk-line circuit 2, well known in the art. Each central switching station is connected to subscriber telecommunication devices 3 by way of a respective telecommunication line 4 that has been assigned a unique calling number by its central switching station. As standard hard-wire telephones, cellular telephones, facsimile machines, information systems, voice-mail systems and other data-communication devices can be connected within the telecommunication switching network, the term "telecommunication device" shall be deemed to include all such devices and their functional equivalents. Likewise, the term "telecommunication process" shall be deemed to include all data-communication processes conducted between two or more telecommunication devices within the telecommunication switching network. In addition, term "telecommunication line" as used hereinafter shall include hard-wire lines, such as copper pairs, as well as any medium or channel permitting transmission of microwave, radio, acoustic and/or optical signals.

In order to compute the cost (i.e., charge) for each telecommunication process conducted through a telecommunication connection across the switching network and to account for these charges over time for subscriber billing purposes, a billing system 5 is operably connected to each central switching station by way of line 6. Typically, for both local calls (i.e. within calling area-code or regional calling area) and long-distance calls (i.e. outside calling area-code or regional calling area), the billing system associated with the central switching station of the "calling" telecommunication device (i.e. line), is capable of computing and accounting for call costs. It is understood, however, that the actual location of the billing system which computes call costs and monthly billing statements from transaction record data, can and will vary from embodiment to embodiment. In addition, utility fees owing to the owners of other central switching stations and trunk-line circuits for use of their lines and equipment during calls outside the calling region and the like, can be accounted for and paid in a conventional manner well known in the art.

Figure 2:
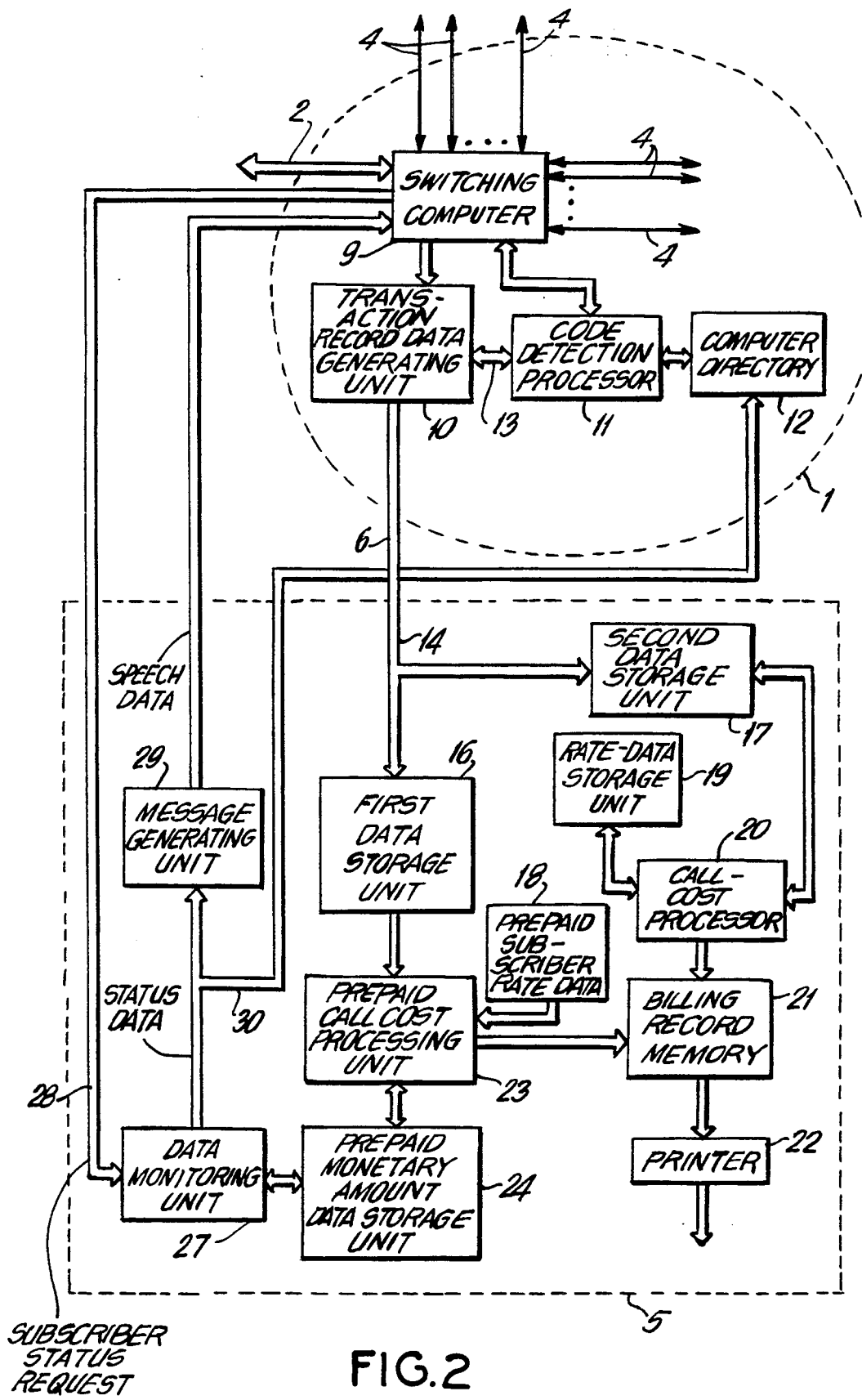
FIG. 2 is a block functional diagram of a first embodiment of the central switching station and billing system of the present invention, which are configurable within the telecommunication switching network of FIG. 1.

In FIG. 2, the first embodiment of the central switching station and associated billing system according to the present invention, is schematically illustrated. As shown each central switching station (e.g. central office or remote housing) 1 of the greater telecommunication switching network comprises a telecommunication switching means 9 and transaction data generating means 10. Preferably, telecommunication switching means 9 is realized in the form of a high-speed switching computer that is specially adapted for establishing interconnections between two or more telecommunication lines (i.e. circuits), designated by the numbers of the calling and called parties. Typically, switching computer 9 is capable of establishing such telecommunication connections between any two or more telecommunication lines, among potentially millions of local subscriber lines within a given area-code specified calling region serviced by a central switching station. In addition, switching computer 9 includes circuitry for measuring the time duration of each telecommunication connection made, accepting signalling information (i.e. on-hook, off-hook and dialing signals), and carrying out telecommunication functions including generation and transmission of dial tone signals, ringing signals, ringback signals, line busy signals and the like, all of which are known in the art. Preferably, switching computer 9 is adapted to receive dialing information communicated by both rotary and Touch Tone dialing techniques.

For calls placed outside the local area code, frankline circuits 2 are operably associated with the switching computers in a conventional manner. Along such "trunks" between telephone buildings, similar on-hook, off-hook and dialing information (i.e. signals) must be exchanged. When metallic connections (i.e. pairs of copper wires contained in telephone calls) are replaced by electronic carrier systems, all of the functions described above must typically be implemented in a transparent fashion. That is, existing customer equipment and telephone office equipment must interconnect and operate with the carrier system as if it consisted of parallel wire pair paths. For a more detailed description of requirements typical in analog and digital telecommunications networks of the type being herein described, reference should be made to "Digital Transmission Building Blocks" by Stewart D. Personick, published in IEEE Communications Magazine, January 1980, Vol. 18, No. 1, at pages 27–36, and incorporated herein by reference.

Switching computer 9 also includes incoming-number buffering circuitry and decoding circuitry "(e.g. code detection processor) 11 for decoding incoming number sequences using a variety of code detection processes. In this first illustrative embodiment of the present invention, such code detection processes would include, for example, area-code detection, calling number detection, called number detection, prepaid subscriber number detection, "800" prepaid sponsor number detection and the like, which are performed upon each incoming number stored in the number buffering circuitry.

Prepaid subscriber code detection can be carried out in a number of possible ways according to the first embodiment of the invention. For example, the calling party situated at a pay phone, for example, dials an additional (e.g. confidential) code number sequence to indicate that the call being placed is to be paid for with prepaid monetary value available to the calling party. When the incoming dialed number sequence is received and buffered at the switching computer, code detection processor 11 detects the confidential code number by comparing the dialed code number against a prepaid subscriber/sponsor directory (i.e. register) 12 containing the code numbers of prepaid subscriber numbers in the calling region of the network. If a prepaid subscriber is detected, through a match between the incoming confidential code number sequence and a code number in directory 12, then code detection processor 11 produces prepaid transaction indicating data 13. This data is then associated with transaction record data produced by transaction record generator 10, and is then provided to associated billing system 10 over data line 14, at the termination of each telecommunication connection. Preferably, transaction record data generator 10 is realized as apparatus capable of generating transaction record data including, for example, the numbers of the calling and called parties, and the time, date and measured time duration of the telecommunication connection.

Preferably, code detection processor 11 is also capable of detecting the calling number and comparing this number against the numbers in directory 12, which also contains the numbers of all prepaid subscriber lines in the calling region of the network. If after a search through directory 12, the detected calling number is determined to represent a registered prepaid subscribing party, then code detection processor 11 outputs prepaid subscriber indicating data. The data is then associated with transaction record data produced by transaction record data generator 11 at the termination of the telecommunication connection.

In instances where a sponsor of prepaid monetary value underwrites an "800" number, which, for example, non-subscribing parties can use to place calls to one or more predesignated parties, an alternative prepaid subscriber code detection process is performed by code detection processor 11. For example, according to this technique, the prepaid subscriber code detection process involves detecting the called "800" number and comparing this number against numbers in directory 12, which also contains the numbers of sponsors of prepaid "800" subscriber lines within the network. If the called number is determined to represent a registered sponsor of a prepaid "800" subscriber line, then code detection processor 11 outputs prepaid transaction indicating data 13. This data is associated with transaction record data produced from transaction record data generator 10, and then provided to associated billing system 5 over data line 14.

As illustrated in FIG. 2, each billing system 5 comprises first and second data storage units 16 and 17, prepaid rate data storage unit 18, non-prepaid rate data storage unit 19, non-prepaid cost processor 20, billing record storage unit 21, record printing device 22, prepaid call cost processor 23, and centralized prepaid monetary value data storage unit 24. First and second data storage units 16 and 17 can be any memory device which stores transaction data records produced from central switching station 1 for each telecommunication process conducted through the network. While illustrated as separate units, first and second data storage units 16 and 17 can be realized as a single data storage device whose storage space is ramified into two separate subspaces. Transaction record data produced for each "prepaid" telecommunication connection is stored in first data storage 16 for subsequent prepaid cost computation and subsequent processing.

Each type of prepaid service offered by the telecommunication carrier results in a transaction record which will be stored in first data storage unit for subsequent cost computation and subsequent processing. For example, as described above, transaction records for calls placed over prepaid subscriber lines and calls from non-subscribing parties over registered prepaid "800" number lines, will be transferred to first data storage unit 16 for subsequent prepaid cost computation and subsequent processing. In contrast, transaction record data produced for each non-prepaid telecommunication connection is storage in second data storage unit 17 for subsequent non-prepaid cost computation and subsequent processing. Transaction record data can be organized in these storage units in a variety of ways. For example, in first storage unit 16, transaction record data can be organized by the number assigned to each subscriber of prepaid telecommunication service, or prepaid telecommunication line which can include sponsored 800 lines offering prepaid service. In second storage unit 17, transaction record data can be organized according to the number of each telecommunication line assigned by the central switching station.

To compute the cost for each non-prepaid transaction, rate-data from rate data storage unit 19 and transaction record data from second data storage unit 17 are both provided to call cost processor 20, as shown. In general, non-prepaid call cost processor 20 can be any suitably programmed data processing device, such as a general purpose computing system with appropriate software for cost computation. Typically, non-prepaid rate data is a function of the time, day, origin and duration of the call, and the distance (i.e. mileage) between the calling and called parties. Thus, such types of information are extracted from each transaction record in second data storage unit 17, in order to select the applicable non-prepaid calling rate for non-prepaid cost computation.

For each transaction record provided to cost processor 20, a billing record is generated and stored in billing record storage unit 21. Each billing record will typically include the transaction record and the computed cost of each telecommunication process conducted across the network. Preferably, for subscribers allocated a telecommunication line, billing record data in storage unit 21 is organized according to numbers assigned to these telecommunication lines. In this way, a complete monthly billing statement can be readily generated for each number (i.e. subscriber), and printed out by printing device 22 for mailing to customers in a conventional fashion. For prepaid subscribers without an allocated line, but having for example a prepaid calling card number, transaction record data can be organized according to assigned subscriber numbers Notably, such organized transaction record data can be used for general and switching station accounting purposes.

To compute the cost for prepaid transactions according to the present invention, call cost processor 23 is operably associated with first data storage unit 16, and centralized monetary value data storage unit 24, and prepaid rate data storage unit 18, as shown in FIG. 2. In general, prepaid call cost processor 23 can be any suitably programmed data processing device, such as a computing system running appropriate software for computing the cost of prepaid telecommunication connections and deducting the computed cost from the balance of the subscriber's available prepaid monetary fund. Centralized data storage unit 24 can be realized by any non-volatile memory device capable of storing data representative of each particular subscriber/sponsor, the date and amount of prepaid (i.e. deposited) monetary value, and running balances of monetary value currently available to each such subscriber/sponsor.

Using the time duration data of each transaction record stored in first data storage unit 16 and the applicable calling rate stored in storage unit 18, the cost of each prepaid transaction is computed. Thereafter, cost processor 23 uses the computed cost to update monetary value data of the corresponding subscriber. This updating procedure is achieved by cost processor 23 subtracting the computed cost from the running balance of the prepaid monetary fund. Preferably, although not necessary, the prepaid calling rate is a uniform rate, independent of the time, date and mileage duration of the call, and is expressed in monetary value per unit of time. Thus, prepaid cost computations can be carried for each prepaid transaction by simply multiplying the time duration of each call by the uniform rate. This prepaid cost accounting capability can, of course, be realized in alternative ways which will become apparent hereinafter to those skilled in the art.

As illustrated in FIG. 2, complete monthly statements reflecting each telecommunication connection made in the switching network by a particular prepaid subscriber or sponsor, and the cost thereof, can be readily generated by cost processor 23, then stored in billing storage unit 21 and subsequently printed out by printing device 22 for mailing to customers.

It may be desirable for the prepaid subscriber or calling party to ascertain the balance of prepaid monetary funds (i.e. monetary value) remaining in his or her prepaid cost account at any instant in time. This can be achieved by dialing a code number representing a request for account status information of a particular subscriber. When this status request code is detected by code detection processor 11, switching computer 9 determines whether sufficient prepaid monetary value is available in that subscriber's prepaid account. This function is achieved by data monitoring processor 27 which is capable of monitoring the present status of prepaid monetary value data for each paid subscriber or sponsor within the network. Preferably, data monitoring means 27 reads current monetary value data stored in central data storage unit 24 for each prepaid subscriber or "800" number sponsor requesting account status information. In general, reading current monetary value data in storage unit 24 can be initiated either automatically, or upon receiving a manually transmitted (i.e. dialed) status request code from the subscriber. These two modes of account status monitoring provides a degree of flexibility desired in many applications.

During automatic monitoring of prepaid account status, data monitoring processor 27 periodically monitors account status information in centralized storage unit 24 and automatically updates directory 12 which is in data communication with processor 27 by data line 30. This directory updating function is achieved by processor 27 indicating (i.e. marking) in directory 12 which registered subscribers have sufficient prepaid monetary value in their account. If sufficient prepaid monetary value remains in the subscriber's account, then transaction record data generator 10 will ensure that each subsequently produced transaction record is stored in first data storage unit 16, provided sufficient monetary value remains therein. If, however, insufficient prepaid monetary funds remain in the subscriber's account, then the produced transaction record will be stored in second data storage unit 17.

During manual monitoring of prepaid account status, a status request 28 issues from switching computer 9 after code detection processor 11 has decoded an incoming code dialed and transmitted by the prepaid subscriber for account status information. As illustrated, this status request from central switching computer 9 is provided to data monitoring processor 27 by way of a data line 28. Status data produced from data monitoring processor 27 is provided to speech message generating unit 29 by way of data line 30. Speech message generating unit 29 converts received status data into an appropriate speech message which is provided to switching computer 9. In response, switching computer 9 transmits an account status message to calling the telecommunication device. Speech message generating unit 29 can be realized by any commercially available speech synthesis system appropriately interfaced with data monitoring processor 27 and the switching computer. Preferably, upon determining that there is sufficient prepaid monetary funds available to the calling party, the speech message transmitted from the switching computer can inform the calling party of various account items, including (i) the remaining balance of prepaid monetary funds and (ii) previously prepaid telecommunication connections established in the network against the prepaid account. Various system prompts may also be generated for particular purposes.

Figure 3:
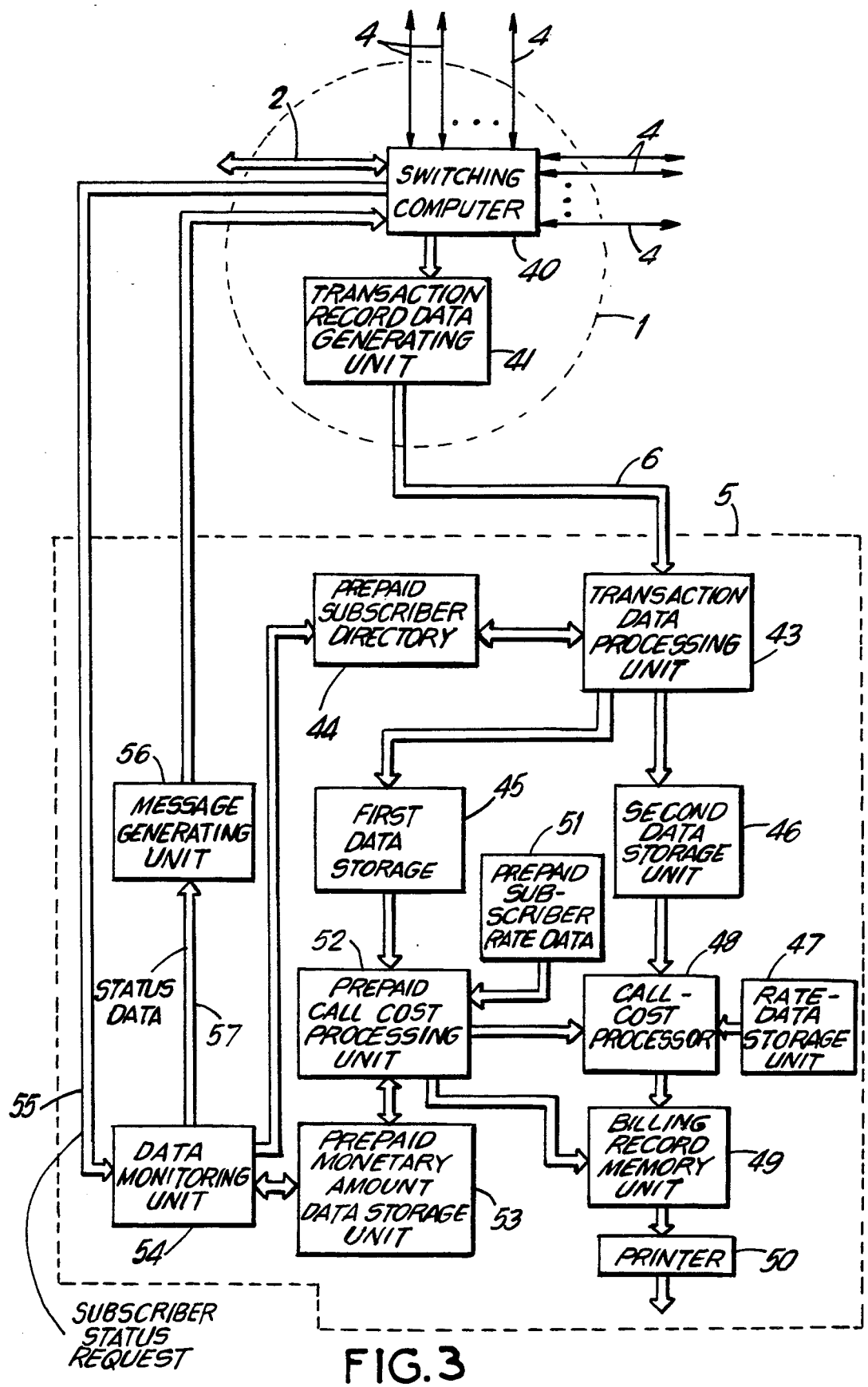
FIG. 3 is a block functional diagram of a second embodiment of the central switching station and billing system of the present invention, which are configurable within the telecommunication switching station of FIG. 1.

In FIG. 3, a central switching station and associated billing system according to the second embodiment of the invention, is schematically illustrated. As will be described in detail below, this embodiment is characterized by all prepaid subscribers and sponsors being registered within the associated billing system(s), thus avoiding the need to detect at the central switching station which callers are subscribers or sponsors eligible for prepaid service.

As illustrated in FIG. 3, each central switching station 1 of the greater telecommunication switching network comprises a telecommunication switching means 40, and transaction data generating means 41. Telecommunication switching means 40 preferably is realized in the form of a high-speed switching computer having essentially all of the capabilities of the switching computer illustrated in FIG. 2. Switching computer 40 also includes incoming-number buffering circuitry and decoding circuitry for decoding incoming number sequences using a variety of code detection processes, such as, for example, area code detection, called number detection, calling number detection and prepaid account status request detection. In this particular embodiment, prepaid subscriber code detection as described above in connection with the first embodiment, need not be performed at the central switching station prior to effectuating a telecommunication connection within the network. Consequently, transaction record data transmitted to billing system 5 is essentially the same for calls placed by prepaid and non-subscribers alike. Advantageously, this approach minimizes requirements on central switching computer 40 when carrying out the method of the present invention.

As illustrated in FIG. 3, each billing system 5 comprises transaction record data processor 43, prepaid subscriber/sponsor directory (i.e. register) 44, first and second data storage units 45 and 46, non-prepaid rate data storage unit 47, non-prepaid call cost processor 48, billing record storage unit 49, printing device 50, prepaid rate data storage unit 51, prepaid call cost processor 52, and a centralized prepaid monetary value data storage unit 53. Transaction record data processor 43 analyzes each transaction record (received from the central switching station) to determine whether its calling or called party number is listed in directory 44. As discussed generally in connection with the first embodiment of FIG. 2, various types of prepaid service will typically be offered by the telecommunication carrier.

For example, prepaid sponsored "800" number service requires analyzing the called number to determine which sponsor is to be charged for telecommunication connections established over the particular "800" number telecommunication line. If the transaction record corresponds to a prepaid account, however listed in directory 44, then the transaction record is transferred to first data storage unit 45 for storage and subsequent call cost computation using a prepaid rate schedule. If, however, the transaction record is not listed in directory 44 under any prepaid service, then it is transferred into second data storage unit 46 for storage and subsequent call cost computation using a non-prepaid rate schedule. First and second data storage units 45 and 46 can be realized by any suitable memory device which stores transaction record data produced from the central switching station. While illustrated as separate units, first and second data storage units 45 and 46 can be realized in single data storage device whose storage space is ramified into two separate subspaces.

To compute the cost of each transaction conducted through the network, non-prepaid rate data from non-prepaid rate-data storage unit 47 and the transaction record data from second data storage unit 46 are both provided to cost processor 48, as shown. In general, cost processor 48 can be any suitably programmed data processor device, such as a computing system running appropriate software for cost computation. Typically, non-prepaid rate data is a function of the time, date, origin and duration of the call, as well as the distance between the calling and called party. Thus, such information is extracted from each transaction record by call cost processor 48 in order to select the applicable calling rate from rate data storage unit 47. Then, call cost processor 48 computes the cost of each transaction by multiplying the time duration of each transaction by the selected non-prepaid calling rate determined applicable to the particular transaction.

For each transaction record transferred to cost processor 48, a billing record is generated and stored in billing record storage unit 49. In general, the billing record includes the transaction record and the computed cost of each telecommunication process conducted across the network. Preferably, for subscribers allocated a telecommunication line, billing record data is organized according to numbers assigned to these telecommunication lines. In this way, a complete monthly billing statement can be readily generated for each number (i.e. subscriber), and printed out by printer 50 for mailing to customers in a conventional fashion. For prepaid subscribers assigned a subscriber calling number, but not having an allocated line, transaction record data can be organized according to the assigned subscriber number. Notably, such organized transaction record data will be used for general and switching station accounting purposes.

To compute the cost of prepaid transactions conducted through the network, prepaid call-cost data processor 52 is operably associated with first data storage unit 45, prepaid rate data storage unit 51, and with centralized monetary value data storage unit 53, as shown. In general, cost processor 52 can be any suitably programmed data processing device, such as a computing system running appropriate software for computing the cost of prepaid calls (i.e. telecommunication connections) and deducting the computer cost from the balance of the subscriber's prepaid monetary fund.

Monetary value data storage unit 53 can be realized by any non-volatile memory device capable of storing data representative of each particular prepaid subscriber or sponsor, the date and amount of each prepaid monetary value installment and the running balances of monetary value currently available to each such subscriber. Using the time duration data of each transaction record in data storage unit 45 and the applicable prepaid calling rate stored in data storage unit 51, the prepaid cost of the transaction is computed by call cost processor 52. Thereafter, cost processor 52 updates monetary value data of the corresponding subscriber stored in data storage unit 53, by subtracting the computed cost from currently available monetary funds recorded in storage unit 53. Preferably, as in the first embodiment, the prepaid calling rate is uniform and independent of the time, date and mileage duration of the call, and is expressed in monetary value per unit of time. In other embodiments of the present invention, prepaid telecommunication cost computation can be realized in a number of alternative ways which will become apparent hereinafter to those skilled in the art. Also, complete monthly statements reflecting each telecommunication connection made in the switching network by a particular subscriber or sponsor, can be readily generated by cost processor 52, stored in billing record memory 49 and subsequently printed out by printer 50 for mailing to customers.

In the second illustrated embodiment of the present invention, specific subscriber options, such as prepaid rate selection and non-prepaid rate enable after prepaid monetary fund depletion, are preselected by the user in advance of conducting telecommunication processes through the network. These subscriber options are then programmed within the billing system (e.g. within directory 44) described above bye, for example, an operator or attendant in either local or remote communication with the billing system. For each party who becomes a prepaid subscriber or sponsor, the line number(s) of the prepaid subscriber or sponsor is entered into directory 44 and the initial deposit of prepaid monetary value is entered into monetary value data storage unit 53. If the prepaid subscriber has also selected the non-prepaid rate enable option, then data indicating this option is also stored in directory 44. In short, all such options are registered with the billing system by storing data representative of subscriber selected options in directory 44. In this way, all transactions can be indexed by transaction data processor 43 in order to reflect which subscribers, including prepayment-service sponsors, selected which options.

In the event that prepaid monetary funds of a subscriber is depleted during an on-going telecommunication connection and the subscriber has registered previously the non-prepaid rate-enable option with the associated billing system, a non-prepaid rate-enable process will automatically be carried out. For example, consider the case where a transaction record is generated for a prepaid telecommunication process, in which available monetary value is depleted prior to its completion. In this case, the transaction record will be stored in first data storage unit 45, as the subscriber is registered in directory 44 as being a prepaid subscriber having selected, for example, the non-prepaid rate-enable option. Thus, when call cost processor 52 decrements the subscriber's prepaid monetary value to zero, prepaid call cost processor 52 will automatically apply the remaining portion of transaction record time and related transaction data to call-cost processor 48, in order to compute call cost using non-prepaid rates, as described hereinbefore. Thereafter, prepaid call cost processor 52 writes data into directory 44 to indicate that the subscriber's prepaid subscription has lapsed, and that all subsequent transaction records of this subscriber shall be subject to non-prepaid rate based cost computation.

In the illustrated embodiment of FIG. 3, data monitoring means 54 is provided for monitoring the current status of prepaid monetary value data for each line subscriber entitled to prepaid call cost servicing. Preferably, data monitoring means 54 is a data processor which, upon receiving either manually transmitted or automatically generated "status request" reads current monetary value data stored in data storage means 53 for a particular prepaid subscriber.

During manual status account monitoring issues switching computer 40 status request after the subscriber has dialed a toll-free account status request code. When this status request code is received at the central switching station, it is buffered and decoded in a straightforward manner as described above. The status request is then transferred from switching computer 40 to data monitoring processor 54 by way of data lines 55. Status data produced from data monitoring processor 54 is provided to message generating unit 56 by way of data lines 57. In the case where a telephone instrument is connected to the prepaid subscriber line over which the account status request code was transmitted, message generating unit 56 converts received status data into an appropriate speech message which is provided to switching computer 40. In response, switching computer 40 transmits the speech message to the calling telecommunication device. Message generating unit 56 can be realized by any commercially available speech synthesis system appropriately interfaced with data monitoring processor 54 and the switching computer. Preferably, upon determining that there is sufficient prepaid monetary funds available to the status inquiring subscriber, the speech message can provide various information items, including (i) the remaining balance of the prepaid monetary fund and (ii) previously prepaid telecommunication connections established in the network against the account. Various system prompts may also be generated for particular purposes.

During automatic account status monitoring, an account status message is automatically generated by status monitoring processor 54 whenever it determines that the prepaid monetary value data of a subscriber (e.g. sponsor) has fallen below a predetermined level. Typically, each prepaid account registered within storage unit 53 is monitored on a periodic or continuous basis. In the case where a facsimile machine is connected to a particular prepaid subscriber line, account status data produced from data monitoring processor 54 is provided to message generating unit 56 by way of data line 57. In this particular embodiment, a facsimile message particularly adapted for reproduction by the subscriber facsimile machine can be formatted and automatically dialed-out over the subscriber line through switching computer 40. In this way, the central switching station can transmit a facsimile message to a subscriber facsimile machine to advise the subscriber that the current balance of its prepaid monetary fund has fallen below predetermined threshold amount. The facsimile message thus serves as a reminder to deposit additional monetary funds with the telecommunication carrier in order to maintain the prepaid account. Whenever the level of available monetary funds of a particular subscriber falls below a predetermined threshold amount, data monitoring processor 54 will write data into directory 44 to indicate that "prepaid account status" has been changed to a non-prepaid subscription.

Having described the structure and function of the apparatus of the present invention, it is now appropriate to illustrate how the method hereof is carried out using such apparatus. For purposes of illustration, three embodiments of the method will be described in connection with the telecommunication system of the second embodiment show in FIGS. 1 and 3.

The first illustrative embodiment of the method hereof involves prepayment of telecommunication connections underwritten by "800" number sponsors.

Prior to placing a telecommunication call across the network, a sponsor of a prepaid "800" number (e.g. line) prepays to the telecommunication carrier, a particular amount of monetary value, e.g. measured in U.S. dollars. This prepaid amount of monetary value shall represent "monetary funds" available for payment of calls placed by non subscribing parties over a pre-assigned "800" number. This prepaid "800" number is then registered within directory 44, shown in FIG. 3. Also monetary value data representative of the amount of monetary value prepaid by the sponsor, is stored in centralized monetary value storage unit 53 and will be available for payment of the cost of each telecommunication connection initiated by a party calling the prepaid 800 number. When carried out, these above described operations set up the sponsor's prepaid 800 number subscription (i.e. account) within the telecommunication network.

When a party transmits an "800"number from its telecommunication device to its central switching station, the incoming "800" number is buffered and detected, and a ringing signal is transmitted over the line of the called 800 party in a conventional manner. At the central switching station of the called 800 number, an offhook signal is generated when the called party enters the off-hook condition, and in response thereto a telecommunication connection is effectuated across each central switching station connecting the called and calling parties. At the central switching station of the called 800 number, a transaction record will be generated by transaction record generator 41, as described hereinabove. Production of each of the transaction record will, of course, involve measuring the time duration of the telecommunication connection across the network. Notably, the transaction record will include at least the phone number of the calling party, the phone number of the called party, the time, date and time duration of the telecommunication connection. Thereafter, the transaction record is transferred to the billing system 5 by way of data line 6, where transaction record data processor 43 processes the transaction record as hereinbefore described and stores the transaction record in either first or second data storage unit 45, 46.

In the present example, the transaction record need not be produced at the central switching station of the calling party. However, as noted above, a transaction record will be produced at the central switching station of the called party, and subsequently processed by processor 43 to determine that the transaction record represents a prepaid 800 number call placed by the calling party. This detection process involves determining that the called 800 number listed in the transaction record is stored in directory 44 and represents a prepaid 800 number sponsor having available monetary funds in its prepaid 800 number account. Having made such a determination, transaction record processor 43 stores the transaction record of the prepaid 800 number call in first data storage unit 45.

Sometime after the termination of the telecommunication connection (e.g. during off-peak hours), the transaction record of the prepaid 800 number call is accessed by call cost processor 52 of the billing system. Call cost processor 52 then uses the measured time duration of the 800 number call and applicable prepaid rate data from storage unit 51 to compute the cost of the 800 number connection. Call cost processor 52 then processes current monetary value data of the prepaid sponsor, stored in storage unit 53, so as to indicate a decrement in the amount of monetary value available in the sponsor's prepaid 800 number account. Notably, this decrement is essentially equal to the computed cost of the 800 number connection.

The same process described above will occur for each subsequent party placing a call over the prepaid 800 number that is registered in directory 44. For each 800 number call, a transaction record is generated at the central switching station of called party on the 800 number line. This transaction record is used to compute the cost of each 800 number connection in the network, and the computed cost is then used to decrement the current amount of monetary value (i.e. monetary funds) available in the sponsor's prepaid 800 number account. When the available monetary funds of the 800 number sponsor falls below a predetermined threshold, data monitoring processor 54 will automatically generate an account status message that is transmitted to the sponsor at a predesignated number. This message will advise the sponsor that monetary funds in its prepaid 800 number account have been depleted to a particular level. The account status message can be expressed in either facsimile or voice format and will alert the sponsor to replenish the prepaid 800 number account if it desires to maintain active status and enjoy the benefits associated with its prepaid 800 number account.

The second illustrative embodiment of the method hereof involves prepayment of telecommunication connections initiated at privately owned or leased telecommunication devices, such as telephones and facsimile machines located in public areas including airports, bus and train terminals, shopping malls and the like. Typically, such privately sponsored publicly-located telecommunication devices are operated by coins, credit-cards or prepayment calling cards, and the sponsors thereof either own or have leased the associated equipment and telecommunication lines from the managing telecommunication carrier. Apparatus used to facilitate coin, credit-card and calling-card operation of such telecommunication devices is well known in the art and is not subject matter of the present invention. As used hereinafter and in the claims, the term "privately-sponsored prepay-type telecommunication device"shall be understood to refer to such telecommunication devices and their equivalents.

Prior to placing a telecommunication call across the network, a sponsor of a group of prepay-type telecommunication device 5 prepays to the telecommunication carrier or its agent, a particular amount of monetary value, e.g., measured in U.S. dollars. This prepaid amount of monetary value shall represent monetary funds available to cover the cost of calls placed over any one of the privately-sponsored prepay-type telecommunication devices. The number assigned to each associated line of the group of privately-sponsored prepay-type telecommunication devices is then registered within directory 44, shown in FIG. 3. Also, data representative of the amount of monetary value prepaid to the telecommunication carrier by the sponsor, is stored in centralized storage unit 53 and will be available for payment of the cost of each telecommunication connection initiated by a party placing a call over one of these registered lines. When carried out, these above described operations set up the private sponsor's prepaid subscription within the telecommunication network.

When a party (i.e. user) dials and transmits a number from one of the registered prepay-type telecommunication devices to its central switching station and complies with payment protocols using coins, credit cards, prepayment calling cards or the like based on conventional rates, the buffered incoming number at the central switching station is detected, and a ringing signal is transmitted over the line of the called party in a conventional manner. At the central switching station of the called number, an off-hook signal is generated when the called party goes into the off-hook condition, and in response thereto a telecommunication connection is effectuated across each central switching station connecting the called and calling parties. At the central switching station of the calling party, a transaction record will be generated by transaction record generator 41, as described hereinabove. Production of each transaction record will, of course, involve measuring the time duration of the telecommunication connection across the network. Notably, the transaction record will include at least the phone number of the calling party, the phone number of the called party, and the time, date and time duration of the telecommunication connection. At the termination of the call, the transaction record is transferred to billing system 5 where transaction record data processor 43 processes the record as hereinbefore described and stores the transaction record in either first or second data storage unit 45 or 46. Notably, such processing involves determining whether the calling number in the transaction record in stored in directory 44 and represents a prepaid sponsor number having available monetary funds in its prepaid account. Having made such a determination, transaction record processor 43 stores in first data storage unit 45, the transaction record of the call initiated by the privately sponsored prepay-type telecommunication device.

Sometime after the termination of the telecommunication connection, each transaction record produced from a privately-sponsored prepay-type telecommunication device is accessed from first data storage unit 45 by call cost processor 52 of the billing system. Call cost processor 52 then uses the measured time duration of the call and applicable prepaid rate data from storage unit 51 to compute the cost of the telecommunication connection. Call cost processor 52 then processes current monetary value data stored in storage unit 53, so as to indicate a decrement in the amount of monetary funds available in the sponsor's prepaid account. Notably, this decrement is essentially equal to the computed cost of the telecommunication connection.

The same process described above will occur for each subsequent party placing a call over any one of the privately sponsored prepay-type telecommunication devices (i.e. lines) registered in directory 44. For each call placed over one of these registered lines, a transaction record is generated at the central switching station in the calling region of the calling party. This transaction record is used to compute the cost of each telecommunication connection in the network initiated from one of these privately sponsored devices. The computed cost is then used to decrement the current amount of monetary value available in the sponsor's prepaid account. When the available monetary funds of the private sponsor falls below a predetermined threshold, data monitoring processor 54 will automatically generate an account status message that is transmitted to the sponsor at a predesignated number. This message will advise the sponsor that monetary funds in its prepaid account have been depleted to a particular level. The account status message can be expressed in either facsimile or voice format and will alert the sponsor to replenish the prepaid account if it desires to maintain active status and enjoy the benefits associated with the prepaid account.

The third illustrative embodiment of the method hereof involves prepayment of telecommunication connections initiated from mobile telecommunication devices, such as, for example, telephones or facsimile machines of a cellular telecommunication network. As shown in FIG. 1, a cellular telecommunication network can be operably connected with a greater public telecommunication switching network, by way of a trunkline circuit 4 or other high capacity communication link well known in the art. For a detailed description of an exemplary digital cellular telecommunication network readily adapted for integration within a public telecommunication switching network, reference should be made to "New AUTOPLEX Cell Site Paves the Way for Digital Cellular Communications," published in AT&T technology, 1990, Vol. 5, No. 4, at pages 20–23, 25 and incorporated herein by reference.

For illustrative purposes, the case where a number of cellular phones belonging to a prepaid subscriber group, will be considered. Notably, however, this example can be easily reduced to the case of a single prepaid cellular phone subscriber.

Prior to placing a telecommunication call across the network, a sponsor of a group of prepaid cellular phones (i.e. cellular phone numbers) prepays to the managing telecommunication carrier, a particular amount of monetary value, e.g., measured in U.S. dollars. This prepaid amount of monetary value shall represent monetary funds available for payment of calls placed by any subscribing cellular phone within the operative range of the cellular telecommunication network. Each cellular phone number belonging to the prepaid group is then registered within directory 44, shown in FIG. 3. Also, monetary value data representative of the amount of monetary value prepaid by the sponsor, is stored in prepaid monetary value storage unit 53 and will be available for payment of the cost of each telecommunication connection initiated by a party calling from one of the prepaid cellular phones of the registered group. When carried out, these above described operations set up the sponsor's prepaid cellular phone subscription within the telecommunication network.

When a prepaid cellular phone dials and transmits its called number over the cellular telecommunication network, the transmitted incoming number is eventually buffered and detected at the mobile switching station 1' of the particular calling region. As illustrated, in FIG. 1, mobile switching station 1' is operably associated with the central switching station of the 914 calling region by way of a trunk line circuit 4 or other high capacity communication link. While there may be more than one mobile switching station associated with each particular calling region, only one such switching station has been shown for purposes of simplicity. As well known in the art, the cellular telecommunication network includes a cellular infrastructure providing RF carrier support and management for maintaining each registered cellular phone in communication with a called party integrated within the cellular network or the public telecommunication switching network. In each case, however, calls will be initiated through a mobile switching station of the calling region within which the call originated.

Each mobile switching station 1' includes a switching computer 40 and transaction record generator 41, as shown in FIG. 3 and described hereinabove. Typically each transaction record of a cellular phone call will be generated at the mobile switching station originating the call through the cellular network. Production of each transaction record will, of course, involve measuring the time duration of the telecommunication connection across the network. Notably, the transaction record will include at least the phone number of the calling party, the phone number of the called party, and the time, date and time duration of the telecommunication connection. Thereafter, the transaction record is transferred to the billing system 5 where processor 43 processes each record as described hereinabove, and then stores the record in either first or second data storage unit 45 or 46. Transaction record processing involves determining that the calling number in the transaction record is stored in directory 44 and represents a prepaid cellular phone number sponsor having available funds in its prepaid account. Having made such a determination, transaction record processor 43 stores the transaction record of the prepaid cellular phone call in first data storage unit 45.

Sometime after the termination of the telecommunication connection, the transaction record of the prepaid cellular phone call is accessed from first data storage unit 45 by call cost processor 52 of the billing system. Call cost processor 52 then uses the measured time duration of the cellular phone call and applicable prepaid rate data from storage unit 51 to compute the cost of the telecommunication connection. Call cost processor 52 then processes current monetary value data of the prepaid sponsor, stored in storage unit 53, so as to indicate a decrement in the amount of monetary value available in the sponsor's prepaid cellular phone account. Notably, this decrement is essentially equal to the computed cost of the telecommunication connection.

The same process described above will occur for each subsequent party placing a call over any one of the prepaid cellular phones registered in directory 44. For each prepared cellular phone call, a transaction record is generated at the mobile switching station in the calling region where the cellular phone call originated. This transaction record is used to compute the cost of each connection in the cellular phone network, and the computed cost is then used to decrement the current amount of monetary value available in the sponsor's prepaid cellular phone account. When the available monetary funds of the sponsor falls below a predetermined threshold, data monitoring processor 54 will automatically generate an account status message that is transmitted to the sponsor at a predesignated number. This message will advise the sponsor that funds in its prepaid cellular phone account have been depleted to a particular level. The account status message can be expressed in either facsimile or voice format and will alert the sponsor to replenish the prepaid account if it desires to maintain active status and enjoy the benefits associated with the prepaid account.

The method and apparatus of the present invention has numerous applications in ground based and mobile telecommunications, including for example, cellular telecommunication networks as described above. In such applications, remote base stations and satellite up and down links will be essentially transparent to the method and apparatus of the present invention.

The illustrative embodiments of the present invention are especially advantageous to subscribers who are collectively organized as a group. In this way, a group of subscriber lines (or numbers) can register by line number (or subscriber calling number) with the central switching station and/or associated billing systems, and thus each have access to a central pool of prepaid monetary funds. For example, any corporation, cooperative apartment, condominium complex, business organization, or group of subscriber lines however associated geographically, socially, or politically can prepay a bulk amount of monetary value to a telecommunication carrier offering prepaid call cost servicing. The line or subscriber numbers of the group are simply registered in directory 12 or 44, and data representative of the bulk amount of prepaid monetary value is stored in centralized storage units 24 or 53 of FIGS. 2 and 3, respectively. Then, anytime a subscriber line or number belonging to this registered group is utilized to effect a telecommunication connection across the network, the transaction record generated is used to compute cost of the prepaid call using the prepaid calling rates. Thereafter, the computed call cost is used to decrement the bulk amount of prepaid monetary value by an amount equal to the computed call cost.

While the particular embodiments shown and described above have proven to be useful in many applications in the telecommunication art, further modifications of the present invention herein disclosed will occur to persons skilled in the art to which the present invention pertains. All such modifications are deemed to be within the scope and spirit of the present invention defined by the appended claims.

What is claimed is:

1. A method for prepayment of telecommunication connections between two or more telecommunication devices each operably associable with telecommunication lines of a telecommunication switching network having a central switching system operably connected to a billing system, said method comprising the steps:

(a) storing in a first storage means in said central switching system, a group of subscriber numbers, each said subscriber number being associated with a subscriber line having membership to a prepaid group of subscriber lines;

(b) storing in a second storage means in said billing system, monetary value data representative of a prepaid amount of monetary value available to each said subscriber line of said prepaid group, for payment of the cost of telecommunication connections in said telecommunication switching network;

(c) transmitting a first called party number over a first subscriber line to said central switching system, in order to establish a first telecommunication connection between at least a first pair of telecommunication devices, wherein at least one of said first pair of telecommunication devices is operably associated with said first subscriber line;

(d) at said central switching system, determining that said first subscriber line is in said prepaid group of subscriber lines;

(e) at said central switching system, measuring the time duration of said first telecommunication connection;

(f) at said billing system, computing the cost of said first telecommunication connection using applicable rate data and said measured time duration of said first telecommunication connection; and (g) at said billing system, processing said stored monetary value data of said prepaid group, to indicate a first decrement in said prepaid amount of monetary value, said first decrement being essentially equal to said computed cost of said first telecommunication connection.

2. The method of claim 1, which further comprises:

(h) transmitting a second called party number over a second subscriber line to said central switching system, in order to establish a second telecommunication connection between at least a second pair of telecommunication devices, wherein at least one of said second pair of telecommunication devices is operably associated with said second subscriber line;

(i) determining that said second subscriber line is in said prepaid group of subscriber lines;

(j) at said central switching system, measuring the time duration of said second telecommunication connection;

(k) at said central switching system, computing the cost of said second telecommunication connection using applicable rate data and said measured time duration of said second telecommunication; and (l) at said central switching system, processing said stored monetary value data of said prepaid group to indicate a second decrement in said prepaid amount of monetary value, said a second decrement being essentially equal to said computed cost of said second telecommunication connection.

3. Apparatus for prepayment of telecommunication connections between two or more telecommunication devices each operably associable with telecommunication lines of a telecommunication switching network having a central switching station operably connected to a billing system, said apparatus comprising:

group register means, in said central switching system, for registering a group of numbers, each said number corresponding to a subscriber line having membership to a prepaid group of subscriber lines;

data storage means, in said billing system, for storing monetary value data representative of a prepaid amount of bulk monetary value available to each subscriber line in said prepaid group, for payment of the cost of telecommunication connections in said telecommunication switching network;

measuring means, in said central switching system, for measuring the time duration of a telecommunication connection established between two or more telecommunication devices, one of which is operably associated with one said subscriber line of said prepaid group;

computing means, in said billing system, for computing the cost of said telecommunication connection using applicable rate data and said measured time duration; and processing means, in said billing system, for processing said bulk amount of monetary value data so as to indicate at least one decrement in said bulk amount of prepaid monetary value, said at least one decrement being essentially equal to said computed cost of said telecommunication connection.

4. The apparatus of claim 3, wherein said group register means, in said central switching system, stores a plurality of numbers corresponding to a plurality of prepaid subscriber lines belonging to an entity selected from the group consisting of a cooperative apartment, a condominium complex and a business organization.

5. The apparatus of claim 3, which further comprises data monitoring means, in said billing system, for storage means.

* * * * *